United States Patent Office 3,342,844
Patented Sept. 19, 1967

3,342,844
ANTIMONY (III) DERIVATIVES OF PARA-ROSANILINE AND THE PREPARATION THEREOF
Edward F. Elslager, Ann Arbor, Mich., assignor to Parke, Davis & Company, Detroit, Mich., a corporation of Michigan
No Drawing. Filed Oct. 30, 1964, Ser. No. 407,870
9 Claims. (Cl. 260—446)

The present invention relates to new organic antimony compounds. More particularly, the invention relates to new salts of pararosaniline with antischistosomal acidic substances containing trivalent antimony, and to methods for their production.

The new organic antimony compounds of the invention can be represented by the formula

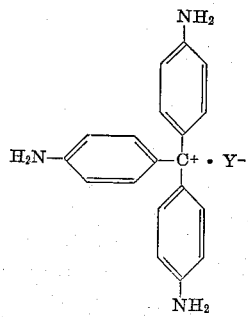

where $Y^-$ is one equivalent of an anion of an antischistosomal acidic substance containing trivalent antimony.

Pararosaniline and its known salts and derivatives are valuable agents in the treatment of schistosomiasis. One of their important advantages is that they do not exhibit the high degree of toxicity shown by other substances used in the treatment of schistosomiasis. Nevertheless it is necessary to administer pararosaniline or one of its known salts or derivatives daily for a period of weeks in order to achieve optimum therapeutic effectiveness. This limitation restricts the use of pararosaniline and its known salts and derivatives in schistosomiasis eradication programs where frequent and regular dosing of every man, woman, and child in large populations poses problems of organization, distribution, cost, and persuasion.

Various trivalent antimony compounds, customarily employed in the form of alkali metal salts, are also useful in the treatment of schistosomiasis. These include antimony potassium tartrate, otherwise known as tartar emetic or as 2-hydroxy-5-oxo-1,3,2-dioxastibiolane-4-glycolic acid monopotassium salt; antimony sodium tartrate; 2 - (4,6 - disulfo - 1,3,2 - benzodioxastibiol - 2 - yloxy)-1-phenol-3,5-disulfonic acid pentasodium salt, otherwise known as sodium antimony (III) bis-pyrocatechol-2,4-disulfonate or as stibophen; 2,3-dimercaptosuccinic acid, cyclic thioantimonate (III), S,S-diester with 2,3-dimercaptosuccinic acid hexasodium salt; lithium antimony thiomalate, also known as anthiomaline; sodium antimony (III) gluconate; and antimony sodium thioglycollate. However, these trivalent antimony compounds have several defects. They are administered almost exclusively either by the intravenous or intramuscular route and must be given over relatively long periods of time for optimum effectiveness. These limitations restrict their usefulness in mass eradication programs. Further, many of these trivalent antimony compounds are relatively unstable in aqueous solution. In addition, the known trivalent antimony compounds presently used in the treatment of schistosomiasis exhibit many toxic side-effects including gastrointestinal upset as well as respiratory, neural, and vascular difficulties.

One of the objects of the present invention is to provide new pararosaniline salts having enhanced effects against schistosomes without a commensurate increase in systemic toxicity for the host.

Another object of the invention is to provide new pararosaniline salts that will enable a shorter treatment period and reduce the amount of drug required for a course of treatment.

A further object of the invention is to provide new, stable antimony-containing salts that can be administered orally at effective and well tolerated doses.

These objects, as well as other objects which will appear hereinafter, are achieved by providing new salts of pararosaniline with antischistosomal acidic substances containing trivalent antimony, said new salts being represented by the formula given above. Normally the salts of the invention contain one equivalent of tris(p-aminophenyl)carbonium cation (pararosaniline cation) for each acidic group of the trivalent antimony substance, but if desired, salts containing lesser amounts of pararosaniline can be prepared by varying the ratios of reactants.

In accordance with the invention, the compounds of the foregoing formula are produced by reacting pararosaniline or a soluble salt of pararosaniline with an antischistosomal acidic substance containing trivalent antimony or with a soluble salt of an antischistosomal acidic substance containing trivalent antimony. The process is preferably carried out by reacting a soluble salt of pararosaniline with a soluble salt of an antischistosomal acidic substance containing trivalent antimony; or by reacting pararosaniline with an antischistosomal acidic substance containing trivalent antimony. Pararosaniline is the carbinol, otherwise known as tris(p-aminophenyl)methanol or as tris(p-aminophenyl)carbonium hydroxide. The term "soluble salt" is used in a relative sense and means a salt having substantially greater solubility than the reaction product in the reaction medium. Some examples of soluble salts of pararosaniline are the hydrochloride, hydrobromide, hydriodide, acetate, sulfate, succinate, and tartrate. Some examples of soluble salts of antischistosomal acidic substances containing trivalent antimony are antimony potassium tartrate and other alkali metal salts of antimonials as illustrated elsewhere in the present description. The term "acidic substances containing trivalent antimony" designates organic compounds of trivalent antimony containing acidic groups such as carboxylic acid and sulfonic acid groups, as well as other compounds of trivalent antimony which can give an acidic reaction, such as antimony trichloride.

The process of the invention is carried out in a relatively unreactive solvent such as water, a lower alkanol, dimethylacetamide, acetonitrile, dimethyl sulfoxide, or mixtures thereof. Other satisfactory reaction media can be chosen from among a wide variety of solvents, particularly those which are neutral and polar. When the reaction is carried out between the soluble salts, a preferred solvent is water. However water is not a preferred solvent when one of the reactants is antimony trichloride or other antimony compound which is decomposed by water. The reactants are employed in approximately the same ratio in which they are to appear in the final product and in most cases one equivalent of the pararosaniline compound is used for each acidic group (in either free acid or salt form) in the trivalent antimony compound. To ensure complete conversion of the antimony compound, up to a moderate excess of the pararosaniline compound can also be used. If desired, the starting materials used in the process can be converted in situ to the desired base, acid, or soluble salt form by treatment with an acid or base, as by neutralizing one or more of the acidic groups with base, by treatment of a salt with a mineral acid, or by treatment of the pararosaniline base with an acid. The temperature is not particularly critical and the process of the invention can be carried out at room temperature or below, although in many cases a high yield and a crystalline form conducive to rapid filtration are facilitated by heating the reaction mixture to 90–100° C., or to the reflux temperature of the solvent, for a few minutes or up to an hour, and then cooling. The invention comprehends the starting materials and final products in their hydrated as well as anhydrous forms.

The compounds of the invention are of value as pharmacological and chemotherapeutic agents. They have antiparasitic activity. Specifically, they are useful antischistosomal agents which exhibit increased schistosomacidal activity without a corresponding increase in toxicity to the host. The compounds of the invention exhibit greater schistosomacidal potency than would be predicted from the sum of the schistosomacidal effects of the pararosaniline and antimony moieties. The compounds of the invention can be administered either orally or parenterally, and oral administration is preferred. They can also be administered in conjunction with other forms of antischistosomal therapy. One of the preferred ways of using the compounds of the invention is subsequent to a period of pre-treatment with a non-antimonial pararosaniline compound such as bispararosaniline pamoate. According to this procedure, treatment is begun using bispararosaniline pamoate alone for a period of a few days up to two weeks. After 5–7 days the schistosomes are damaged and shift into the liver. In this altered state, the schistosomes are hypersusceptible to antimonial therapy. Following the indicated period of pre-treatment, treatment with bispararosaniline pamoate is continued while treatment with a compound of the present invention is commenced. A preferred compound of the invention is pararosaniline antimony tartrate.

The formulas as given herein arbitrarily represent the pararosaniline cation as one of its equivalent resonance forms, in which the positive charge is carried on the central carbon atom. In other resonance forms, the positive charge is carried on one of the nitrogen atoms.

The invention is illustrated by the following examples.

*Example 1*

(a) A solution of 20.0 g. antimony potassium tartrate hemihydrate in 400 ml. water is added to a solution of 19.4 g. pararosaniline hydrochloride in 1600 ml. hot water. The reaction mixture is cooled and the insoluble product is collected on a filter, washed with water, and dried at 60° C. in vacuo. This product is hydrated pararosaniline antimony tartrate; it melts unsharply above 260° C. The product can also be designated as the pararosaniline salt with one formula weight antimony tartrate; as pararosaniline antimonyltartrate; and as the tris(p-aminophenyl)carbonium salt with one formula weight antimony tartrate. In anhydrous form it can be represented by the structural formula

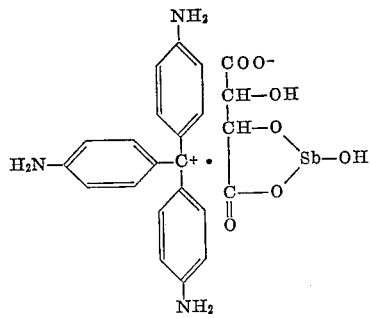

(b) A solution of 3.24 g. pararosaniline hydrochloride in 100 ml. hot methanol is added to a solution of 3.34 g. antimony potassium tartrate hemihydrate in 100 ml. water and the mixture is heated to 90° C. and cooled. The insoluble product is collected on a filter, washed with water, and dried. It is pararosaniline antimony tartrate as described above.

(c) A solution of 3.24 g. pararosaniline hydrochloride in 100 ml. dimethylformamide is added to a solution of 3.34 g. antimony postassium tartrate hemihydrate in 100 ml. water. The mixture is heated to 90° C., cooled, and diluted with water. The insoluble product is collected on a filter, washed with water, and dried. It is pararosaniline antimony tartrate as described above.

(d) A solution of 3.24 g. pararosaniline hydrochloride in 50 ml. hot dimethyl sulfoxide is added to a solution of 3.34 g. antimony potassium tartrate hemihydrate in 100 ml. water and the mixture is heated to 90° C. and cooled. The insoluble product is collected on a filter, washed with water and dried. It is pararosaniline antimony tartrate as described above.

*Example 2*

Acetic acid 6 g. is added to a slurry of 30.5 g. pararosaniline in 150 ml. water. The pararosaniline used in this procedure is the carbinol, otherwise known as tris-(p-aminophenyl)carbonium hydroxide. The mixture is stirred and heated to 90° C. and then a solution of 30.9 g. antimony sodium tartrate in 100 ml. hot water is added and the mixture is allowed to cool. The insoluble product is collected on a filter, washed with water, and dried. It is pararosaniline antimony tartrate as described above.

*Example 3*

A solution of 4.5 g. 2-(4,6-disulfo-1,3,2-benzodioxastibiol-2-yloxy)-1-phenol-3,5-disulfonic acid pentasodium salt heptahydrate in 100 ml. water is added to a solution of 8.1 g. pararosaniline hydrochloride in 500 ml. hot water. The antimony compound employed in this procedure is also known as sodium antimony (III)bis-pyrocatechol-2,4-disulfonate heptahydrate and as stibophen. The reaction mixture is cooled and the insoluble product is collected on a filter, washed with water and dried in vacuo at 65° C. It is the hydrated pararosaniline salt with ⅓ formula weight of 2-(4,6-disulfo-1,3,2-benzodioxastibiol-2-yloxy)-1-phenol-3,5-disulfonic acid; M.P. 325–327° C. In anhydrous form it can be represented by the structural formula

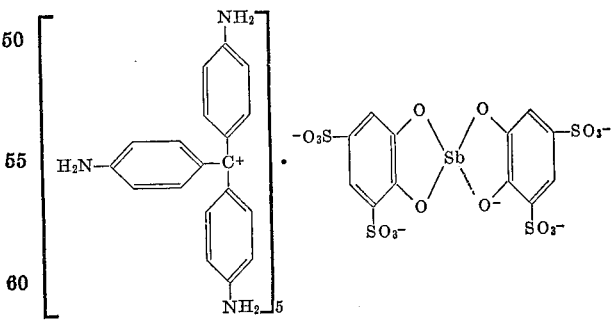

*Example 4*

A solution of 4.8 g. 2,3-dimercaptosuccinic acid, cyclic thioantimonate (III), S,S-diester with 2,3-dimercaptosuccinic acid, hexasodium salt in 200 ml. water is added with stirring to a solution of 9.7 g. pararosaniline hydrochloride in 800 ml. hot water. The reaction mixture is cooled and the insoluble product is collected by filtration and dried in vacuo at 65° C. This product is the hydrated pararosaniline salt with 1/6 formula weight 2,3-dimercaptosuccinic acid, cyclic thioantimonate (III), S,S-diester with 2,3-dimercaptosuccinic acid; M.P. 182–185° C. In anhydrous form it can be represented by the structural formula It is the pararosaniline salt with 1 formula weight antimony thioglycollate; it melts unsharply above 200° C. In anhydrous form it can be represented by the structural formula

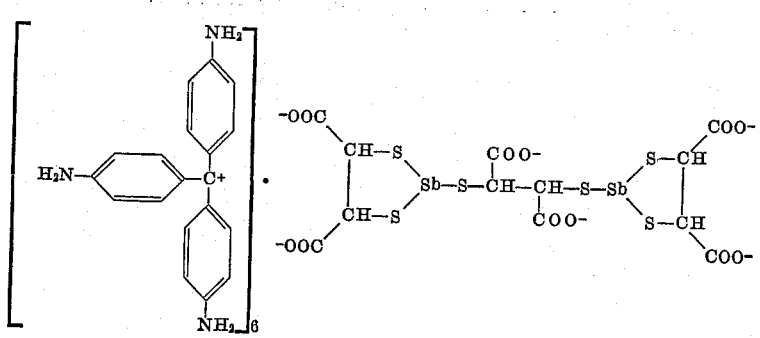

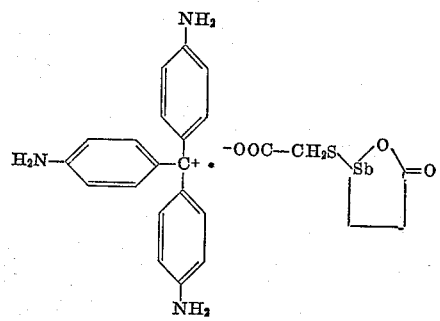

Example 5

A solution of 3.1 g. lithium antimony thiomalate (calculated on the basis of anhydrous material) in 100 ml. water is added with stirring to a solution of 9.7 g. pararosaniline hydrochloride in 800 ml. hot water. The antimony compound employed in this procedure is also known as anthiomaline. The mixture is cooled and the insoluble product is collected on a filter and dried in vacuo at 60° C. The product is the hydrated pararosaniline salt with 1/6 formula weight antimony thiomalate; it melts unsharply above 200° C. In anhydrous form it can be represented by the structural formula

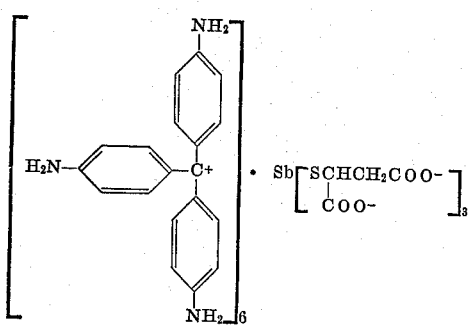

Example 6

A solution of 3.4 g. sodium antimony (III) gluconate in 25 ml. water is added to a solution of 3.2 g. pararosaniline hydrochloride in 100 ml. hot water. The reaction mixture is cooled to room temperature and the insoluble product is collected on a filter, washed with water, and dried in vacuo at 65° C. The product is hydrated pararosaniline antimony (III) gluconate; M.P. 250° C.

Example 7

A solution of 32.5 g. antimony sodium thioglycollate in 100 ml. water is added to a solution of 34.7 g. pararosaniline acetate in 200 ml. hot water. The reaction mixture is cooled and the insolube product is collected on a filter, washed with water, and dried in vacuo at 60° C.

Example 8

A solution of 4.56 g. antimony trichloride in 50 ml. methanol is added to a slurry of 3.05 g. pararosaniline in 175 ml. warm methanol. The pararosaniline used in this procedure is the carbinol, otherwise known as tris(p-aminophenyl)carbonium hydroxide. The reaction mixture is filtered and a small amount of insoluble precipitate is discarded. The filtrate is evaporated almost to dryness to give a residue of the pararosaniline salt with antimony trichloride; M.P. 270–273° C. following crystallizations from methanol-chloroform.

I claim:
1. Salts of pararosaniline with antischistosomal acidic substances containing trivalent antimony.
2. Pararosaniline antimony tartrate.
3. Pararosaniline salt with 1/5 formula weight 2-(4,6-disulfo-1,3,2 - benzodioxastibiol-2-xyloxy) - 1-phenol-3,5-disulfonic acid.
4. Pararosaniline salt with 1/6 formula weight 2,3-dimercaptosuccinic acid, cyclic thioantimonate (III), S,S-diester with 2,3-dimercaptosuccinic acid.
5. Pararosaniline salt with 1/6 formula weight antimony thiomalate.
6. Pararosaniline antimony (III) gluconate.
7. Process for the production of salts of pararosaniline with antischistosomal acidic substances containing trivalent antimony which comprises reacting a member of the class consisting of pararosaniline and soluble salts thereof with a member of the class consisting of antischistosomal acidic substances containing trivalent antimony and soluble salts thereof.

8. Process for the production of pararosaniline antimony tartrate which comprises reacting a soluble salt of pararosaniline with an antimony alkali metal tartrate.

9. Process for the production of pararosaniline antimony tartrate which comprises reacting pararosaniline hydrochloride with antimony potassium tartrate in aqueous medium.

References Cited

UNITED STATES PATENTS 3,297,531  1/1967  Friedheim _____ 260—446 X

TOBIAS E. LEVOW, *Primary Examiner.*

W. F. W. BELLAMY, *Assistant Examiner.*